April 3, 1956     H. A. WINTERMUTE     2,740,493
GAS CLEANING METHOD AND APPARATUS
Filed Dec. 30, 1953     4 Sheets-Sheet 2
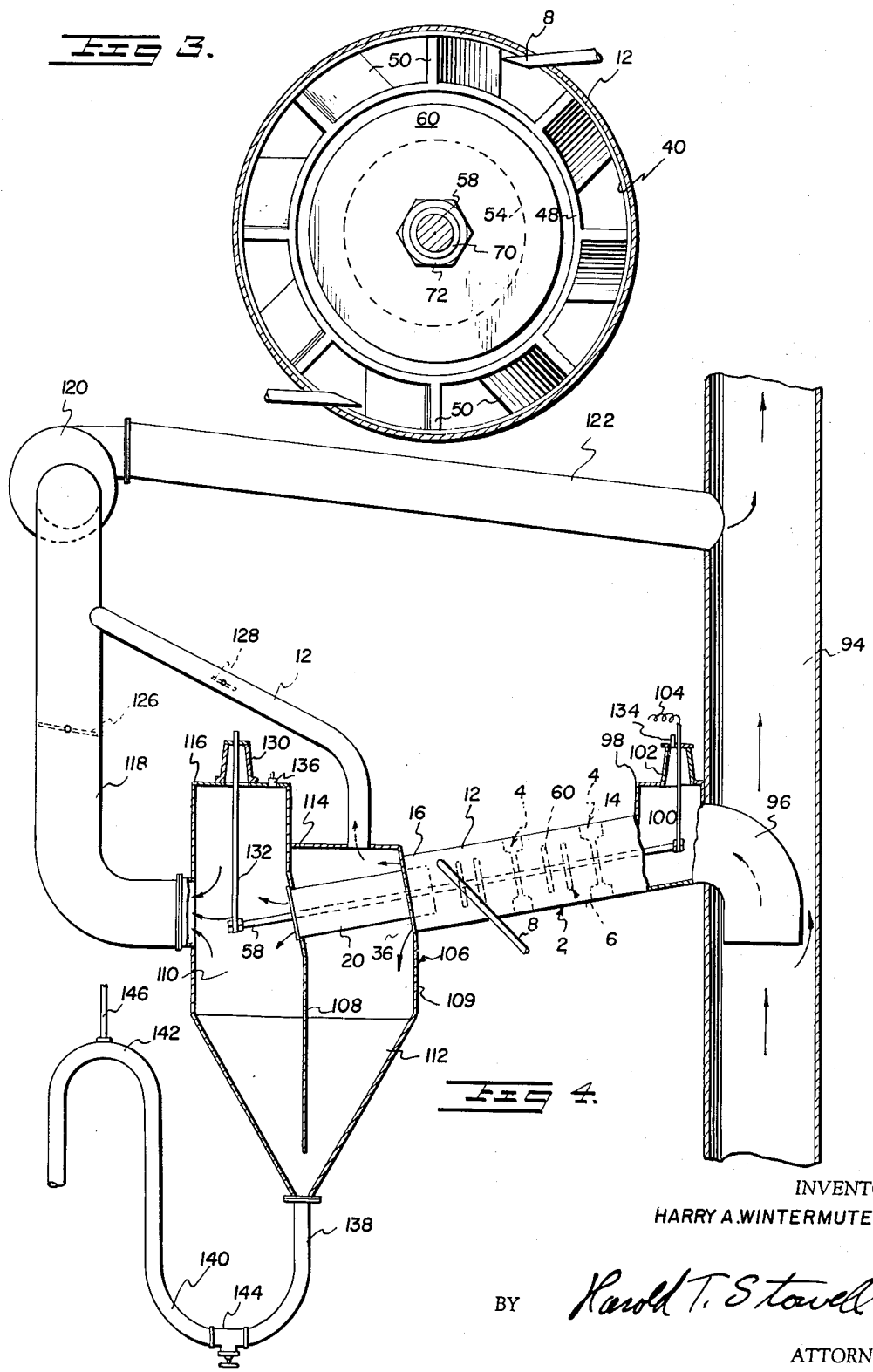
INVENTOR
HARRY A. WINTERMUTE
BY Harold T. Stowell
ATTORNEY

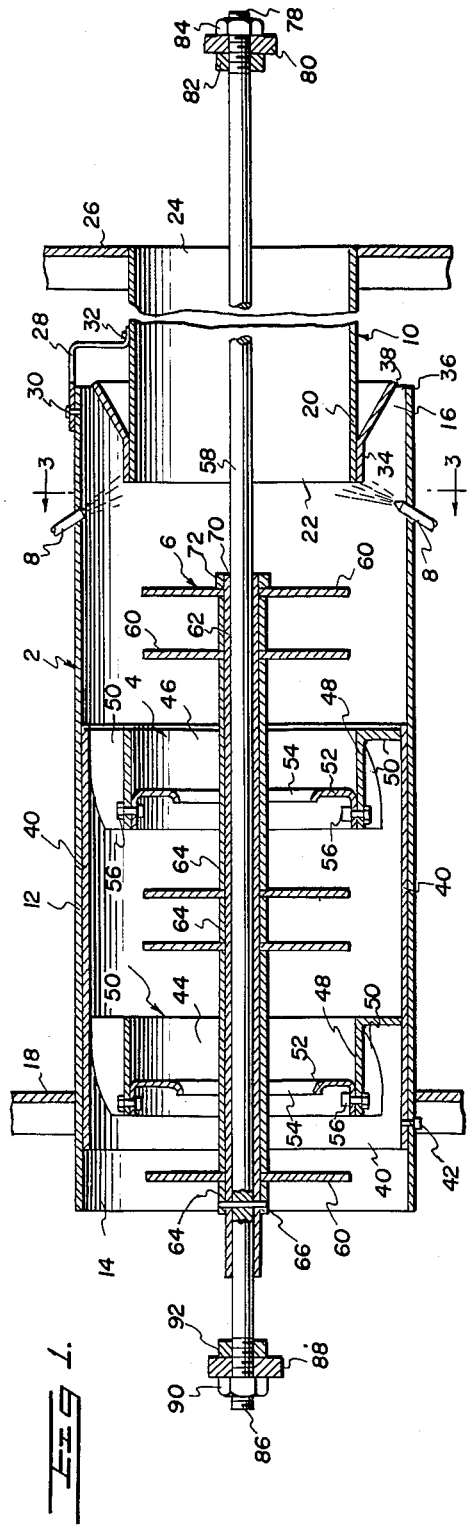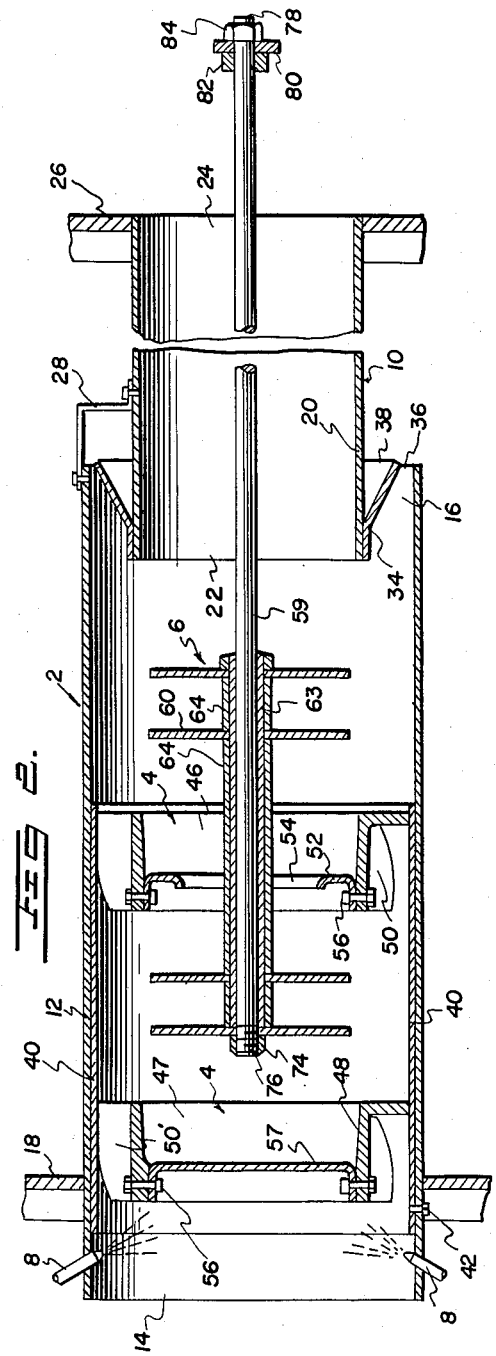

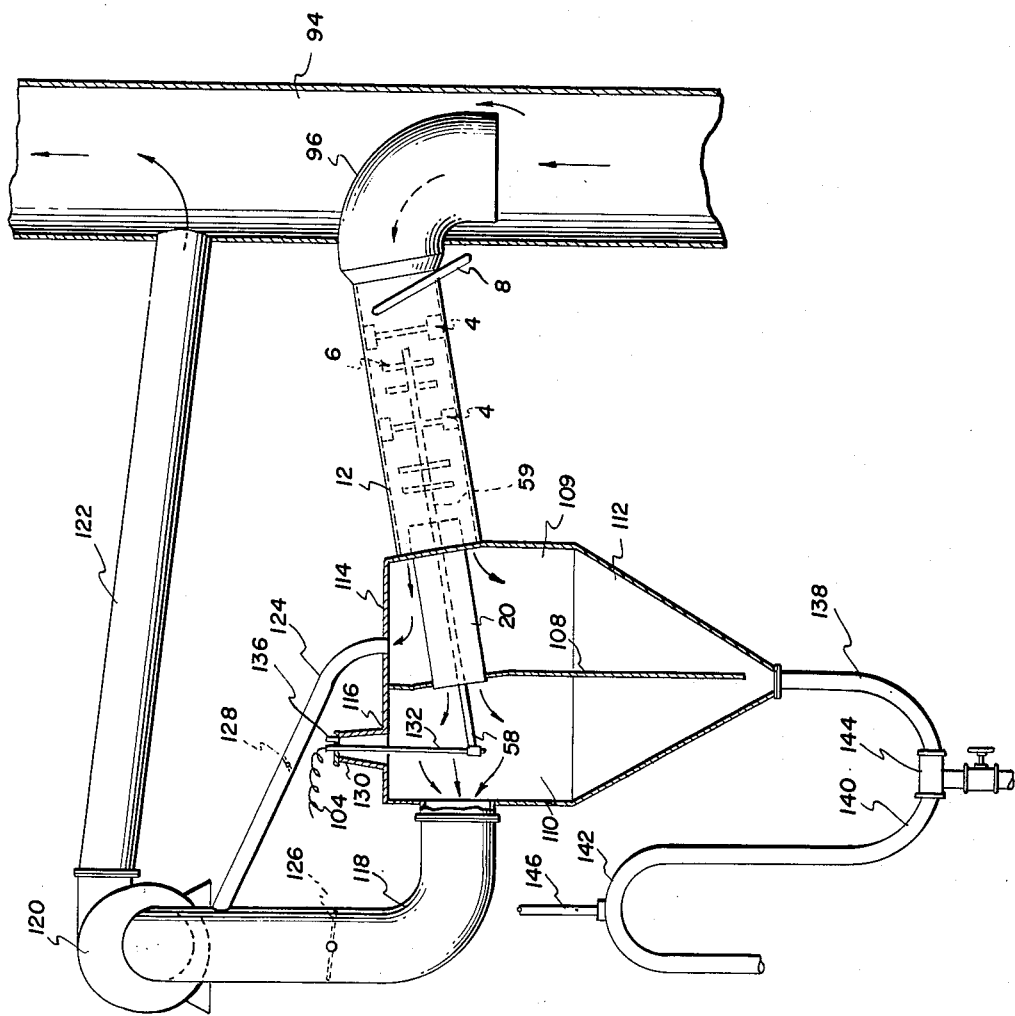

April 3, 1956 — H. A. WINTERMUTE — 2,740,493
GAS CLEANING METHOD AND APPARATUS
Filed Dec. 30, 1953 — 4 Sheets-Sheet 4

INVENTOR
HARRY A. WINTERMUTE.
BY Harold T. Stowell
ATTORNEY

United States Patent Office 2,740,493
Patented Apr. 3, 1956

2,740,493

GAS CLEANING METHOD AND APPARATUS

Harry A. Wintermute, Plainfield, N. J., assignor to Research Corporation, New York, N. Y., a corporation of New York Application December 30, 1953, Serial No. 401,139

5 Claims. (Cl. 183—7)

This invention relates to gas cleaning methods and apparatus. More particularly, it is concerned with (a) methods for separating solid particulate materials from gases in which the solid particles are suspended and with (b) apparatus for use in carrying out such methods by subjecting a stream of particle contaminated gas to a combined electrical and centrifugal treatment and entraining solid particles removed from the gas by such treatment in a liquid.

This application is a continuation-in-part of copending application Serial No. 255,168, filed November 7, 1951, by Harry A. Wintermute, for "Electrified, Centrifugal Gas Cleaning Device," now Patent No. 2,667,942.

Subjecting particles suspended in a gas stream to centrifugal force is a well known, basic method of separating the particles from the gas and many different forms of apparatus utilizing this method are known. Likewise, removing solid particles from gas by electrical precipitation is well known. Furthermore, it is known to combine centrifugal separation with electrical precipitation to remove suspended solids from gases and several varieties of equipment have been devised which utilize these combined operations.

Regardless of whether centrifugal separation or electrical precipitation is used to clean gas of suspended solids, there is always present the problem of how to successfully remove the separated particles from the apparatus and how to prevent accumulation of the particles upon various portions of the gas cleaning equipment. Thus, although many known forms of such apparatus will separate or precipitate solids from a suspending gas stream, they are unsatisfactory for the treatment of many contaminated gas streams because the soot, dust or other particles removed from the gas accumulate in the equipment and often catch fire. On the other hand, the accumulated solids often build up to a point where in time they are removed in enlarged clusters or groups by the gases being treated and are carried out into the air surrounding the gas cleaning installation causing greater annoyance to the inhabitants of the surrounding area than would be the case if no gas treatment at all was employed.

A principal object of this invention is the provision of new methods for removing solid particulate material from gases.

Further objects include:

1. Apparatus for removing soot, dust or similar suspended solid particulate material from gases wherein the gases are subjected to a combined electrical and centrifugal gas cleaning operation followed by liquid entrainment of the particles removed from the suspending gas by the combined electrical and centrifugal operation.

2. The provision of such apparatus which reduces evaporation of entraining liquid to a minimum even in situations where volatile materials, such as water, are employed as the entraining liquid.

3. The provision of such apparatus designed for continual drainage of liquids from the gas conduits, chambers and other portions of the apparatus.

4. The provision of such apparatus which permits the gas cleaning conduits or chambers thereof to be positioned either in a horizontal or vertical position.

5. The provision of new gas cleaning apparatus which is simple in construction and is easy to fabricate and assemble or disassemble for cleaning or repair.

6. The provision of new gas cleaning equipment which employs no moving parts and which is highly effective for removing suspended particles from a contaminated gas stream.

7. The provision of electrical, centrifugal gas cleaning equipment which is especially useful in removing suspended solids from exhaust gases of incinerators such as those employed in large apartment house developments, industrial plants or the like.

8. The provision of new gas cleaning methods which are substantially free of the hazard of fire even when employed for removing suspended solids from hot flue gases such as those issuing from incinerators, furnaces or the like and in which accumulation of removed solids and periodic discharge of particle clusters is prevented.

9. The provision of new gas cleaning methods which subject solid particulate material suspended in gas streams to maximum separatory forces while causing only a minimum of pressure drop in the gas stream to be created.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished according to the present invention by the process which comprises forming a gas having solid particulate material suspended therein into a cylindrical stream, causing the stream to acquire a swirling motion so that the gas and suspended particles are subjected to centrifugal force which is directed normally of the axis of the flow of the gas stream, then while the gas stream is in the swirling cylindrical condition, subjecting it to an electrical precipitation operation which combines with the centrifugal force to cause the gas suspended particles to concentrate or precipitate in the peripheral portion of the cylindrical swirling gas stream. At one or more points along the flow path of the gas, particle entraining liquid, such as water, is injected tangentially into said cylindrical gas stream so that the liquid flows along in contact with the peripheral portion of the cylindrical gas stream. Finally, the swirling cylindrical gas stream is separated into a liquid containing, particulate material enriched peripheral portion and a substantially liquid free, particulate material depleted interior portion.

Preferably, the gas stream is formed into a cylindrical shape by passing into a tubular conduit and the swirling motion is imparted to the stream by gas directing vanes which are suitably positioned within the tubular conduit. It is also preferable to accomplish the electrostatic operation by establishing a corona discharge between disc-like electrodes located within the tubular conduit and the inner wall of the tubular conduit.

A more complete understanding of the new procedures and apparatus of this invention may be had by reference to the accompanying drawings in which the same reference numerals are used in all the figures for equivalent elements. In the drawings:

Fig. 1 is an axial sectional view of one form of gas cleaning unit in accordance with the invention;

Fig. 2 is an axial sectional view of another form of gas cleaning unit of the invention;

Fig. 3 is an enlarged sectional view taken along the plane of the line 3—3 of Fig. 1;

Fig. 4 is a diagrammatic side view partially in section of gas cleaning apparatus including a gas cleaning unit of the type shown in Fig. 1;

Fig. 5 is another diagrammatic side view partially in section of gas cleaning apparatus including a gas cleaning unit such as shown in Fig. 2.

Figure 6:
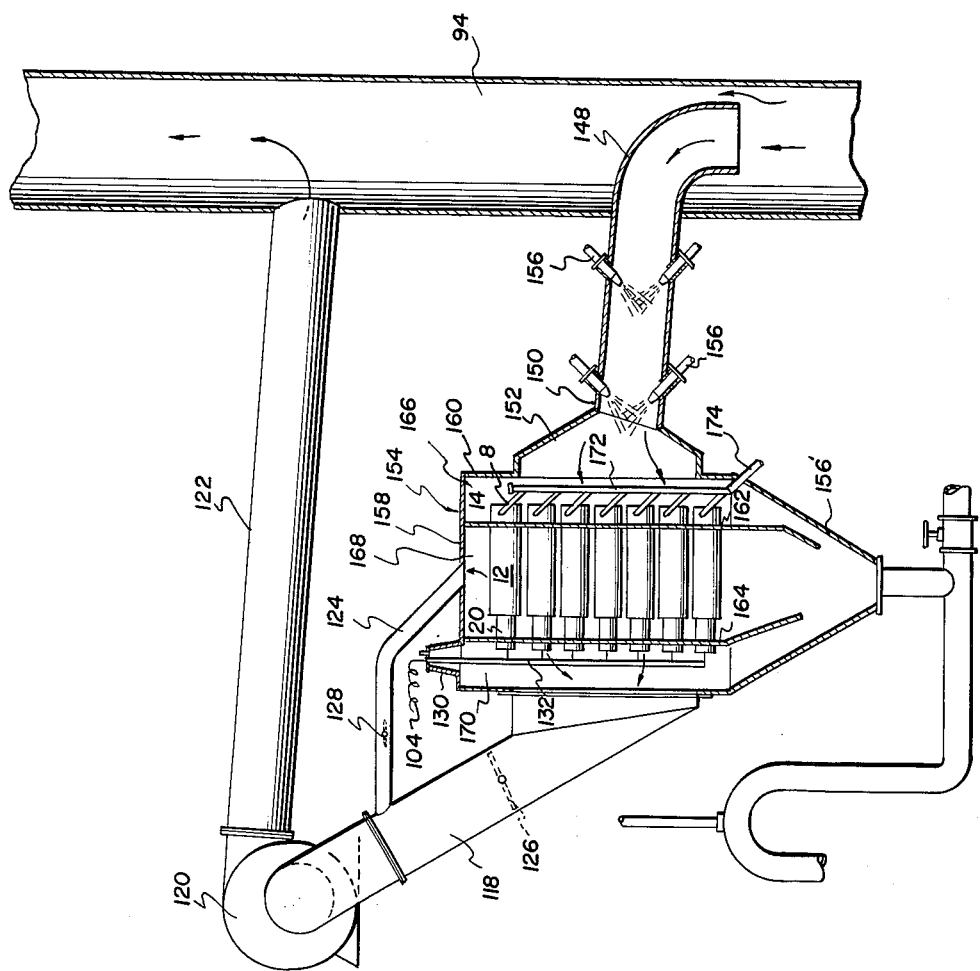
Fig. 6 is a diagrammatic side view partially in section of gas cleaning apparatus including a plurality of gas cleaning units as shown in Fig. 2.

Referring in detail to the drawings, the gas cleaning units of Figs. 1 to 3 basically comprise tubular conduit member 2, gas swirling means 4, flow control and electrostatic precipitation means 6, liquid injectors 8 and gas skimming outlet means 10 for dividing the gas stream upon exit from the conduit member 2 into a peripheral portion and an internal portion.

The conduit member 2 comprises a tube or pipe 12 of uniform diameter throughout its length having an open gas inlet end 14 and an open gas outlet end 16. The tube 12 is supported at the inlet end in a diaphragm member or wall 18 having a circular opening receiving the tube with a close fit, and, if desired, the joint between the tube 12 and the wall 18 may be tack-welded if desired.

The gas skimming outlet means 10 comprises a discharge tube 20 of smaller outside diameter than the inside diameter of tube 12, which is positioned coaxially with respect to the tube 12. The tube 20 has gas inlet end 22, which projects a short distance inwardly of the gas outlet end 16 of tube 12, and a gas outlet end 24. This discharge tube 20 is supported at its outlet end 24 in a circular opening in the wall 26 and the joint between the wall and tube may be tack-welded, if desired. An L-shaped bracket 28 formed of a narrow strip of metal is secured to the tube 12 by suitable means such as a screw 30 and to the tube 20 by screw 32. The bracket 28 insures maintenance of proper centering of the tubes and gives added support to the assembly. A plurality, for example three, of the brackets 28 may be spaced about the periphery of the tube assembly for added strength.

The skimming outlet means 10 also includes a conical skirt member 34 which is welded to the outside of tube 20 at the inlet end 22. Skirt member 34 flares outwardly toward the discharge end of tube 12 so that a restricted annular orifice 36 is formed between outer edge 38 of the skirt 34 and the outlet end 16 of tube 12.

Each gas swirling means 4 comprises a sleeve 40 slidably fitted within the tube 12 and removably secured in the tube by the screw 42. The sleeve 40 in Fig. 1 carries sets 44 and 46 of swirling vanes longitudinally spaced in the sleeve, while the sleeve 40 in Fig. 2 carries sets 46 and 47 of swirling vanes. These vane sets may be fabricated as castings and each has a ring portion 48 carrying generally radially extending vanes 50. The vanes 50 are welded to the sleeve 40 and are inclined to the axis of the tube 12 to impart a swirling or helical motion to the gas that passes between the vanes. Both sets of vanes 44—46 and 47—46 are inclined in the same direction.

Flanges 52 having openings 54 therein are fastened to the interior of the rings 48 in vane sets 44 and 46 by the bolts 56. In the gas cleaning unit of Fig. 2, a plate 57 is similarly fixed within ring portion 48 of vane set 47. The flanges 52 and plate 57 are designed to prevent gas from passing through the central portion of the tube 12 and to direct the gas flow through the vanes 50. The central openings 54 in flanges 52, in contrast to plate 57, are necessary to prevent arcing or shorting of the electrode means 6.

The electrostatic precipitation flow control means 6 comprise support rod 58 or 59 and disc-shaped discharge electrodes 60. Electrodes 60 are supported upon sleeves 62 or 63, which are slidably carried upon the support rods and are held apart by spacer sleeves 64. In the unit of Fig. 1, the sleeves 62 and 64 toward the inlet end of the unit are positioned on the rod by a drift pin 66 which passes through matching holes in the rod and sleeves. The opposite end 70 of the sleeve 62 is externally threaded and a nut 72 is screwed thereon for the purpose of retaining the discharge electrodes compressed against the spacer sleeves 64 for proper positioning. In the unit of Fig. 2, end 74 of sleeve 63 is internally threaded so that the sleeve may be screwed upon externally threaded end 76 of the support rod 59.

In the units of both Figs. 1 and 2, support rods 58 and 59 are threaded at the exit end 78 and are held upon the frame members 80 by nuts 82 and 84. The inlet end 76 of rod 59 is unsupported whereas the end 86 of rod 58, in Fig. 1, passes through the frame member 88 and is retained therein by nuts 90 and 92.

The discharge electrodes 60 contain peripheral serrations which act as discharge points. This construction of the electrodes is more fully shown and described in co-pending application, Serial No. 255,168.

The fluid injectors 8 may be positioned at any suitable spot along the tube 12, but for the sake of easy assemblage or disassemblage of the apparatus, they should enter the tube 12 either adjacent the outlet end, as in the case of the unit of Fig. 1, or the inlet end as in the case of the unit of Fig. 2. The injectors 8 preferably consist of tubes having nozzles designed to emit a thin film of liquid which will flow tangentially into the tube 12 around the inside of the tube. Moreover, the liquid injectors 8 enter the tube 12 in such a way that the film of liquid is injected co-currently with the helical flow of gas, i. e., in the same direction as the pitch of vanes 50.

The gas cleaning unit shown in Figs. 1 to 3 is preferably fabricated of structural metal, such as steel, cast iron or the like.

In operation, gas to be cleaned, for example, boiler flue gases carrying suspended fly ash, incinerator exhaust gases, contaminated fly ash and soot, and similar gases, is passed through the tube assembly from left to right as seen in Figs. 1 and 2 under a pressure differential existing between the inlet opening 14 and orifice 36 of tube 12 and outlet 24 of tube 20. The electrostatic field for electrical precipitation is obtained by impressing a high electrical potential (from a source not shown) between the electrode assembly 6 and the tube 12, sufficient potential being used to cause the discharge electrodes 60 to emit corona discharge.

Gas entering the cleaning units is caused to flow through the gas turning vanes 50 either by the plate 57 in the unit of Fig. 2 or by the electrode member 60 which precedes the flange 52 of the unit of Fig. 1 and serves as a baffle to direct the flow of gas between the vanes 50 preventing substantial flow of gas through the opening 54 in flange 52. The electrodes also prevent the confined whirling gas stream from expanding and losing a large portion of its vortical motion.

Particulate material suspended in the gas passing through the cleaning unit is subjected to combined electrical and centrifugal precipitation forces. Thus, as the gas passes through the corona discharge emitted from the electrodes 60, the suspended material is electrically charged with a sign, the same as the sign of the discharge electrode. The electric field existing between the discharge electrode structure and the tube 12 tends to move the charged particles toward tube 12. At the same time, as the gas passes between the vanes 50 of the swirling assemblies 4, a helical motion is imparted to the gas creating a centrifugal force which tends to throw the suspended particles toward the inner wall of the tube 12. Centrifugal force thus joins the electrical forces in moving the suspended material toward the outside of the cleaning zone. As the gas passes through the zone between the first and second vane assemblies 4, it continues to whirl. In this zone, the gas is subjected to further electrical precipitation and the suspended material becomes more concentrated in the peripheral portion of the gas stream. Again, the electrode elements 60 preceding the apertured flanges 52 of the second vane set, act as baffles to maintain annular flow of gas and to direct the gas stream through the second vane sets 4 rather than through the openings 54. The whirling annular stream then flows past the remaining discharge electrodes and is there subjected to further electrical precipitation conditions.

The combined electrical and centrifugal forces to which the suspended particles are subjected causes the suspended material to be concentrated in a very thin layer adjacent the wall of the tube 12. A traveling film of liquid exists along at least part of the length of the tube 12 around the inner wall of the tube and is caused to travel along the tube in the same direction as the gas flow both by the force initially applied to the liquid film by the injection means 8 and by frictional contact with the gas stream. In the unit of Fig. 1, this liquid film exists only at the outlet end of the tube whereas in the unit of Fig. 2, the film extends all the way from in front of the first vane assembly to the outlet end 16 of the tube 12.

As the suspended particles are caused to concentrate adjacent the inner wall of the tube 12, they become entrapped in the liquid film and are carried by the liquid out of the cleaning unit through the orifice 36 at the outlet end 16. Momentum also carries a thin layer of gas out orifice 36 along with substantially all the remainder of the particulate material which has not become entrapped in the liquid. Owing to the restricted nature of the orifice 36, most of the gas stream is turned inwardly creating an interior gas stream portion which flows out the discharge tube 20 as clean gas. The turning movement of the interior gas portion throws out of the gases a final, though small increment, of suspended material which passes out the orifice 36 with the liquid and peripheral gas stream portion exiting through the orifice.

Incinerators operated in populated areas, e. g., apartment house incinerators, present special problems in fly ash and soot removal. Thus, exhaust gases from such units consists largely of combustible sooty particles which are hard to control. It has been discovered that the combination of liquid entrapment with electrical and centrifugal precipitation, as described above, can be used to successfully clean the exhaust gases issuing from such incinerators. Without the combination of liquid entrapment, although there is a precipitation of suspended particles by the electrical and centrifugal forces, the particles have a tendency to agglomerate and escape out the exhaust stack of the incinerator in clusters which may be more troublesome to the inhabitants surrounding the incinerator than would be the case where no attempt at all is made to clean the gases. However, by combining liquid entrainment with the electrical and centrifugal precipitation, this "snowing" of particles is eliminated. Furthermore, the incinerator exhaust gases are hot and the suspended, combustible sooty material in them has a tendency to catch fire. By the use of liquid entrainment with proper choice of liquid, the firing of the collected sooty material is prevented even when the gas stream from which they are collected contain substantial quantities of oxygen.

For practical reasons, water is the preferred entrapping liquid, but since the exhaust gases are quite hot, they have a tendency to evaporate large quantities of such a volatile liquid as water, if the water is introduced into the cleaning equipment as an open spray. This is undesirable because it results in the loss of the entraining liquid and can add to further complications in disposal of the cleaned exhaust gases. It has been found that with the entraining liquid injected in the tangential, co-current method described above, substantially less evaporation of the liquid takes place than is the case where it is introduced as an open spray into the gas stream.

Fig. 4 shows a gas cleaning installation utilizing a gas cleaning unit of the general type shown in Fig. 1.

An exhaust stack 94 from, for example, an incinerator, boiler or the like, is provided with a side entering, gas turning elbow 96 which leads to the cleaning unit inlet chamber 98. A support rod 100 is held within the chamber 98 by the insulating bushing 102 fitted to the top of the chamber. Support rod 100 passes through the bushing 102 and is connected at its top end to lead wire 104 which supplies high potential electric current from a source not shown.

The inlet end 14 of the tube 12 is joined to the chamber 98 while the outlet end 16 of the tube is joined to the collection unit 106. The collection unit 106 comprises an upper portion which is divided by central partition 108 into a waste collecting chamber 109 and clean gas chamber 110, a conical bottom portion 112, top panels 114 and 116.

A cleaned gas conduit 118 leads from the clean gas chamber 110 by way of a suction fan 120 and flue pipe 122 back to the stack 94.

A draw-off pipe 124 passes through the top panel 114 to connect the chamber 108 to the conduit 118 so that gas may be drawn off from this chamber to create a slight suction on the gas and liquid which passes through orifice 36.

Dampers 126 and 128 are provided in conduit 118 and pipe 124, respectively, to control the quantity of gas which flows through them.

Top panel 116 carries an insulating bushing 130 which suspends a rod 132 to which the end 78 of support rod 58 is attached.

Air inleakage tubes 134 and 136 are provided in bushing 102 and top panel 116, respectively, to permit a small quantity of air to be drawn into the equipment at these points under the action of suction fan 120 in order to keep the upper portions of the equipment free of accumulations of soot or other gases which would increase the tendency of the apparatus to arc if the air inleakage tubes were not present.

The conical bottom 112 of collection unit 106 leads to a drain pipe 138 which has elbows 140 and 142 to form a liquid seal against the suction of fan 120. A drain valve 144 is provided in the line 138 in order to allow the line and the apparatus to be cleaned and a vent pipe 146 enters elbow 142 of the pipe in order to prevent siphoning of the liquid from the unit 106.

Although the sealing elbows 140 and 142 are shown as located adjacent the equipment, other arrangements can be employed, such as locating the liquid draw-off quite distant from the other compartments of the apparatus. This may be desirable in some cases where the liquid seals are moved inside a building to protect them from the cold.

The gas cleaning unit incorporated in the equipment between elbow 96 and member 106 contains the vane assemblies 4, electrode assemblies 6 and liquid injector units 8 as has been described in connection with the details of such units illustrated in Fig. 1.

In operation, the exhaust gases passing up the stack 94 are divided by elbow 96 into a major portion which passes through the elbow into chamber 98 and a minor portion which flows past the elbow 96 on out the stack as illustrated by the flow arrows on Fig. 4. By proper regulation of the exhaust fan 120, all the gases passing thru flue 94 can be drawn into the elbow 96 and thru the treating chamber 12.

The gases which pass through elbow 96 into the chamber 98, enter tube 12, are given a swirling motion by vane assemblies 4 and are subjected to electrical precipitation by the electrode assembly 6. As described, entraining liquid is injected through tube 8. This film of liquid, along with the peripheral portion of the gas stream, passes through orifice 36 into the chamber 109, the liquid falling to the conical bottom 112 while the gas from chamber 109 passes out through the draw-off tube 124. The cleaned, interior portion of the gas stream, on the other hand, passes through the tube 20 into the chamber 110 and then out the conduit 118, through suction fan 120 and duct 122 for return to the stack 94.

All of the ducts or flues, such as 12, 118 or 122, of the apparatus are at a slight angle so that liquids will continually drain from them and there will be no liquid accumulation in any parts of the equipment except in the conical bottom 112 of the collection unit 106. It should also be observed that the gases are drawn from the stack by elbow 96 at a level below the discharge level of duct or flue 122. With this arrangement, no stack damper is required and when the fan 120 is stopped, all gases pass directly out through the stack.

The gas cleaning installation shown in Fig. 5 is basically the same as that of Fig. 4 except that a gas cleaning unit with liquid injector positioned at the gas inlet side, i. e., the type shown in Fig. 2, is used in place of the form used in the equipment of Fig. 4 in which the liquid injector enters the outlet side of the unit. This modification calls for the discharge electrode support rod 59 to be held at only one end with the result that chamber 98, insulating bushing 102 and related elements of the equipment of Fig. 4 are eliminated in the apparatus of Fig. 5. Otherwise, the equipment of Fig. 5 is the same as that of Fig. 4 and the mode of operation of the two installations is the same.

Fig. 6 illustrates a gas cleaning equipment installation for treating boiler or incinerator flue gases in which a plurality of gas cleaner units as shown in Fig. 2 are incorporated.

The stack 94 is provided with a gas draw-off side entering conduit 148 which connects at its outlet end 150 with the funnel 152 which, in turn, leads to the housing 154. Gas conditioning sprays 156 are threaded or welded into gas draw-off conduit 148.

The housing 154 comprises a conical bottom 156, a top 158, vertical, cylindrical side 160 and two baffles 162 and 164 which divide the housing 154 into a manifold chamber 166, a waste draw-off chamber 168 and a cleaned gas draw-off chamber 170. As in the case of previously described equipment, the cleaned gas chamber 170 is connected by conduit 118, suction fan 120 and flue 122 to the exhaust stack 94.

A plurality of the gas cleaning units such as shown in Fig. 2 are mounted within the housing 154 with the inlet ends 14 of tubes 12 passing through the baffle 162 and the outlet tubes 20 passing through the baffle 164. The electrode assemblies within the cleaning units are supported at the outlet end only upon the element 132 which is suspended from the insulating bushing 130 and is connected by the lead wire 104 to the source of high potential electrical current.

The tangential liquid injectors 8 are all connected through a manifold 172 to the supply pipe 174 that leads to a source of particle entraining liquid such as water (not shown).

In operation, the major portion of gas passing up the flue 94 is deflected by conduit 148, into funnel 152 and chamber 166. From there, it enters the tubes 12 of the gas cleaning units and is subjected to the described electrical and centrifugal precipitation operations plus the tangential liquid entraining. The soot, fly ash or other suspended material thrown out of the gas by these combined actions passes with the entraining liquid into the conical bottom 156 from whence it is passed to the sewer or other disposal while the cleaned gas is directed by tubes 20 into chamber 170 and thence by the conduit 118, fan 120 and flue 122 out the stack.

From the foregoing description, it can be seen that the present invention provides new gas cleaning methods and equipment combining in a unique, cooperating way the principles of centrifugal separation, electrical precipitation and liquid entrainment. The methods may be carried out with a minimum of mechanical attention and a high degree of efficiency.

The apparatus used with the methods is easily fabricated and assembled or disassembled for cleaning or repair. It can be formed of a wide variety of different materials and may be installed in either horizontal or vertical position. Since there are no moving parts and since the methods and apparatus substantially eliminate the fire hazard and prevent "snowing" of soot or ash particles from exhaust stacks onto surrounding areas, they are particularly useful for treating and cleaning exhaust gases from apartment house incinerators, boilers or similar units which are located in relatively highly populated areas that present unusual problems in a satisfactory disposal of flue gases.

I claim:

1. Gas cleaning apparatus comprising a tubular conduit member having an open gas inlet and an open gas outlet, annularly arranged swirling vanes positioned within the conduit to cause gas passing through the conduit to assume a swirling motion and to be centrifugally forced toward the inside wall of the conduit as it spirals through the conduit, a plurality of disc-like electrode elements carried upon a support rod positioned coaxially within the conduit, said electrodes being electrically insulated from said conduit and said vanes, duct means for discharging a liquid tangentially into the conduit adjacent the inner wall thereof in the same direction as the pitch of said vanes, and a discharge tube having an open gas inlet and an open gas outlet end and having an outside diameter smaller than the inside diameter of said conduit projecting into the outlet end of said conduit and being positioned coaxially with respect to the conduit, said discharge tube constituting gas skimming means for separating the gas passing through the apparatus into a peripheral portion and an internal portion substantially greater in volume than said peripheral portion.

2. A process for separating solid particulate material from a gas in which it is suspended which comprises forming a solid particulate material contaminated gas into a cylindrical stream, causing said stream to acquire a swirling motion whereby the substances comprising the gas stream are subjected to centrifugal force directed normally of the longitudinal axis of flow of said stream, subjecting said stream simultaneously to an electrical precipitation operation, forming a moving film of liquid about said cylindrical gas stream, said film moving co-currently with the gas stream and thereafter separating said stream into a liquid containing, particulate material enriched peripheral portion and a particulate material depleted interior portion, separating the said peripheral portion into gas and liquid portions, and returning the gaseous portion to the particulate material depleted portion.

3. Gas cleaning apparatus comprising a tubular conduit member having an open gas inlet and an open gas outlet, means positioned within said conduit for swirling gas passing through the conduit so that the gas and particulate material suspended therein is caused to be centrifugally forced against the inside wall of said conduit as the gas swirls therethrough, electrode means for subjecting gas therein to an electrostatic precipitation operation, said electrode means comprising a support rod positioned coaxially with respect to the conduit and a plurality of disc like discharge electrodes insulatedly supported on said rod within said conduit normal to the axis of the conduit, means for injecting liquid to entrain particles of solid material tangentially into said conduit adjacent the inner wall thereof co-currently with the swirling gas stream, and gas outlet means positioned in the outlet end of said conduit for separating the gas stream into a peripheral portion and an internal, particulate material depleted portion.

4. Gas cleaning apparatus comprising a tubular conduit member having an opened gas inlet and an opened gas outlet, means positioned within said conduit for swirling gas passing through the conduit to cause the gas and particulate materials suspended therein to be centrifugally forced against the inside wall of the conduit as the gas passes therethrough, a disc like electrode insulatedly carried upon a support rod positioned coaxially within the conduit, means for injecting liquid for entraining particles of solid material tangentially into said conduit adjacent the inner wall thereof co-currently with the swirling gas stream and gas outlet means positioned in the outlet end of said conduit for separating the gas stream into a peripheral portion and an internal particulate material depleted portion said means for swirling the gas stream comprising vane members positioned against the inner wall of the conduit and baffle means for directing the gas through said vanes.

5. Gas cleaning apparatus according to claim 3 in which said liquid injecting means comprises a tube which passes tangentially through the conduit and has a discharge opening formed so that liquid ejected from said opening will flow as a film upon the inside wall of said conduit in a direction co-current with the swirling gas passing through the conduit.

References Cited in the file of this patent

UNITED STATES PATENTS

| | | |
|---|---|---|
| 975,391 | Blaik | Nov. 15, 1910 |
| 1,331,225 | Wolcott | Feb. 17, 1920 |
| 1,371,995 | Nesbit | Mar. 15, 1921 |
| 1,381,719 | McGee et al. | June 14, 1921 |
| 1,828,646 | Dantsizen | Oct. 20, 1931 |
| 2,702,605 | Kneass, Jr. | Feb. 22, 1955 |